United States Patent
Takashima et al.

(10) Patent No.: US 10,890,105 B2
(45) Date of Patent: Jan. 12, 2021

(54) EXHAUST GAS TURBOCHARGER

(71) Applicant: MITSUBISHI HEAVY INDUSTRIES ENGINE & TURBOCHARGER, LTD., Sagamihara (JP)

(72) Inventors: Reiko Takashima, Tokyo (JP); Takao Yokoyama, Tokyo (JP); Masaki Tojo, Kanagawa (JP)

(73) Assignee: MITSUBISHI HEAVY INDUSTRIES ENGINE & TURBOCHARGER, LTD., Kanagawa (JP)

( * ) Notice: Subject to any disclaimer, the term of this patent is extended or adjusted under 35 U.S.C. 154(b) by 0 days.

(21) Appl. No.: 16/467,823

(22) PCT Filed: Feb. 28, 2017

(86) PCT No.: PCT/JP2017/007948
§ 371 (c)(1),
(2) Date: Jun. 7, 2019

(87) PCT Pub. No.: WO2018/158849
PCT Pub. Date: Sep. 7, 2018

(65) Prior Publication Data
US 2019/0323422 A1 Oct. 24, 2019

(51) Int. Cl.
*F02B 37/02* (2006.01)
*F02B 33/40* (2006.01)

(52) U.S. Cl.
CPC ............ *F02B 37/025* (2013.01); *F02B 33/40* (2013.01)

(58) Field of Classification Search
CPC ........ F02B 37/025; F02B 33/40; F02B 39/00; F01D 11/00; F01D 11/001; F01D 11/02;
(Continued)

(56) References Cited

U.S. PATENT DOCUMENTS

| 4,157,881 A | 6/1979 | Kasuya |
| 10,301,952 B2 | 5/2019 | Ausbrooks |

(Continued)

FOREIGN PATENT DOCUMENTS

| CN | 1693674 A | 11/2005 |
| CN | 201351511 Y | 11/2009 |

(Continued)

OTHER PUBLICATIONS

Written Opinion of the International Searching Authority and English translation of the International Search Report, dated May 23, 2017, for International Application No. PCT/JP2017/007948, with an English translation of the Written Opinion of the International Searching Authority.

(Continued)

*Primary Examiner* — Jesse S Bogue
*Assistant Examiner* — Loren C Edwards
(74) *Attorney, Agent, or Firm* — Birch, Stewart, Kolasch & Birch, LLP (57) ABSTRACT

The present invention includes: a turbine wheel 24 that is attached to a rotating shaft 14 and that has a plurality of turbine blades in the circumferential direction; scroll passages 15Aa, 15Ab that are formed in a spiral shape on the outside of the turbine wheel 24, and that are formed by being divided into a plurality of sections in the circumferential direction, the passages communicating with each other at the position of the turbine wheel 24 disposed between respective tongue sections 15Ac, 15Ad; and threads 51 that are provided on an back facing surface 41 disposed so as to oppose the back surface of the turbine wheel 24, the back surface being on the axially opposite side from the turbine blade side, and the linear parts extending from starting points 51a near the tongue sections 15Ac, 15Ad toward the rotating (Continued)

shaft 14 side so as to control the passage of fluid between the back surface and the back facing surface 41.

20 Claims, 6 Drawing Sheets

(58) Field of Classification Search
CPC ...... F01D 5/046; F01D 9/026; F05D 2220/40; Y02T 10/144
See application file for complete search history.

(56) References Cited

U.S. PATENT DOCUMENTS

| | | |
|---|---|---|
| 2006/0038064 A1 | 2/2006 | Mandet et al. |
| 2008/0038110 A1 | 2/2008 | Roberts et al. |
| 2012/0128471 A1 | 5/2012 | Luck et al. |
| 2012/0159946 A1 | 6/2012 | Sauerstein |
| 2013/0129497 A1 | 5/2013 | Keller |
| 2014/0219790 A1* | 8/2014 | Houst ................ F02B 37/025 415/208.1 |
| 2016/0003096 A1 | 1/2016 | Fraser |
| 2016/0102678 A1 | 4/2016 | Crandall et al. |

FOREIGN PATENT DOCUMENTS

| | | |
|---|---|---|
| CN | 102434230 A | 5/2012 |
| CN | 102482990 A | 5/2012 |
| CN | 202441480 U | 9/2012 |
| CN | 102985659 A | 3/2013 |
| CN | 103967541 A | 8/2014 |
| CN | 104956045 A | 9/2015 |
| CN | 105507962 A | 4/2016 |
| CN | 105927294 A | 9/2016 |
| CN | 108480533 A | 2/2017 |
| DE | 2558878 A1 | 7/1977 |
| EP | 1577505 A2 | 9/2005 |
| GB | 19142848 A | 12/1914 |
| GB | 696817 A | 9/1953 |
| JP | 61-178034 U | 11/1986 |
| JP | 2003-227344 A | 8/2003 |
| JP | 4797788 B2 | 10/2011 |
| JP | 2016-20652 A | 2/2016 |
| WO | WO 2015/051891 A1 | 4/2015 |

OTHER PUBLICATIONS

Chinese Office Action and Search Report, dated Sep. 24, 2020, for Chinese Application No. 201780075872.6, with an English machine translation of the Chinese Office Action.

* cited by examiner

FIG. 9

EXHAUST GAS TURBOCHARGER

TECHNICAL FIELD

The present invention relates to an exhaust gas turbocharger.

BACKGROUND ART

For example, a turbocharger disclosed in PTL 1 adopts a configuration in which an inner scroll passage and an outer scroll passage are formed so that a flow of exhaust gas for rotationally driving a turbine wheel in a turbine housing is divided into an inner peripheral side and an outer peripheral side. In addition, as a multi-entry type turbine housing, PTL 2 discloses a configuration in which a turbine scroll is divided into a plurality of pieces in a circumferential direction.

CITATION LIST

Patent Literature

[PTL 1] Japanese Unexamined Utility Model Registration Application Publication No. S61-178034
[PTL 2] Japanese Patent No. 4797788

SUMMARY OF INVENTION

Technical Problem

As disclosed in PTL 1, according to a turbine in which a scroll is divided into a plurality of pieces in the circumferential direction and which has the inner scroll passage and the outer scroll passage, in a case where pressure of one scroll passage is low, exhaust air flowing into the other scroll passage having high pressure passes through a back surface side without passing through a rotor blade side of a turbine wheel, thereby causing a possibility that the exhaust air may leak out to the one scroll passage side. Therefore, a throughput of the turbine wheel decreases, thereby resulting in inefficiency.

The present invention is made in order to solve the above-described problem, and aims to provide an exhaust gas turbocharger which adopts a configuration in which a scroll passage is divided into a plurality of pieces in a circumferential direction, and which can prevent decreasing turbine efficiency by suppressing a leakage flow to the scroll passage on a low pressure side.

Solution to Problem

According to an aspect of the present invention, there is provided an exhaust gas turbocharger including a turbine wheel attached to a rotating shaft and having a plurality of turbine blades in a circumferential direction, respective scroll passages formed in a spiral shape outside the turbine wheel, divided into a plurality of pieces in the circumferential direction, and communicating with each other at a position of the turbine wheel located between mutual tongue sections, and a thread disposed on a back facing surface located to face a back surface axially opposite to the turbine blade side of the turbine wheel, and extending toward the rotating shaft side from a starting point in the vicinity of the respective tongue sections so as to suppress a passage of a fluid between the back surface and the back facing surface.

In addition, in the exhaust gas turbocharger according to the aspect of the present invention, it is preferable that the starting point of the thread is located within a range of ±30 degrees based on a center of the rotating shaft from a straight line connecting the tongue section and the center of the rotating shaft.

In addition, in the exhaust gas turbocharger according to the aspect of the present invention, the thread may be continuously formed from one of the tongue sections to the other one of the tongue sections along a side portion of the rotating shaft.

In addition, in the exhaust gas turbocharger according to the aspect of the present invention, the threads may be continuously formed from one of the tongue sections to the other one of the tongue sections along a side portion of the rotating shaft, and may be respectively located in both side portions of the rotating shaft serving as a boundary.

In addition, in the exhaust gas turbocharger according to the aspect of the present invention, the back facing surface may be formed in a plate section to be located on the back surface side of the turbine wheel, and the thread may be formed integrally with the plate section.

In addition, in the exhaust gas turbocharger according to the aspect of the present invention, it is preferable that the thread includes a convex object projecting from the back facing surface toward the back surface of the turbine wheel.

In addition, in the exhaust gas turbocharger according to the aspect of the present invention, the back facing surface may be formed in a plate section to be located on the back surface side of the turbine wheel. The thread may include a convex object projecting from the back facing surface toward the back surface of the turbine wheel, and may be attached separately from the plate section.

In addition, in the exhaust gas turbocharger according to the aspect of the present invention, the back facing surface may be formed in a plate section to be located on the back surface side of the turbine wheel. The convex object may be disposed in the plate section so that the starting point is locked to an upstream side in the tongue section in a rotating direction of the turbine wheel.

In addition, in the exhaust gas turbocharger according to the aspect of the present invention, the thread may include a concave object recessed opposing the back surface of the turbine wheel from the back facing surface. It is preferable that the concave object has an inclined bottom surface recessed while being inclined from an upstream side to a downstream side in a rotating direction of the turbine wheel, and has a standing wall surface standing up from the inclined bottom surface toward the back surface of the turbine wheel.

In addition, in the exhaust gas turbocharger according to the aspect of the present invention, the thread may include a concave object recessed opposing the back surface of the turbine wheel from the back facing surface. It is preferable that the concave object has a first inclined bottom surface recessed while being inclined from an upstream side to a downstream side in a rotating direction of the turbine wheel, has a first standing wall surface standing up from the first inclined bottom surface toward the back surface of the turbine wheel, further has a second standing wall surface opposing the first standing wall surface on the downstream side, and has a second inclined bottom surface rising up while being inclined from the second standing wall surface toward the back surface of the turbine wheel.

Advantageous Effects of Invention

According to the present invention, the back facing surface fixedly located facing the back surface of the turbine wheel includes the thread extending toward the rotating shaft side from the starting point in the vicinity of the respective tongue sections so as to suppress the passage of the fluid between the back surface and the back facing surface. In this manner, it is possible to suppress a leakage flow to the scroll passage on low pressure side by adopting a configuration in which the scroll passage is divided into a plurality of pieces in the circumferential direction. As a result, a large amount of the exhaust gas can pass through the turbine blade side of the turbine wheel. Therefore, decreasing turbine efficiency can be prevented by suppressing a decrease in a throughput of the turbine wheel.

DESCRIPTION OF EMBODIMENTS

Hereinafter, an embodiment according to the present invention will be described in detail with reference to the drawings. The present invention is not limited by the embodiment. In addition, configuration elements in the following embodiment include those which can be easily replaced with each other by persons skilled in the art or those which are substantially identical to each other.

Figure 1:
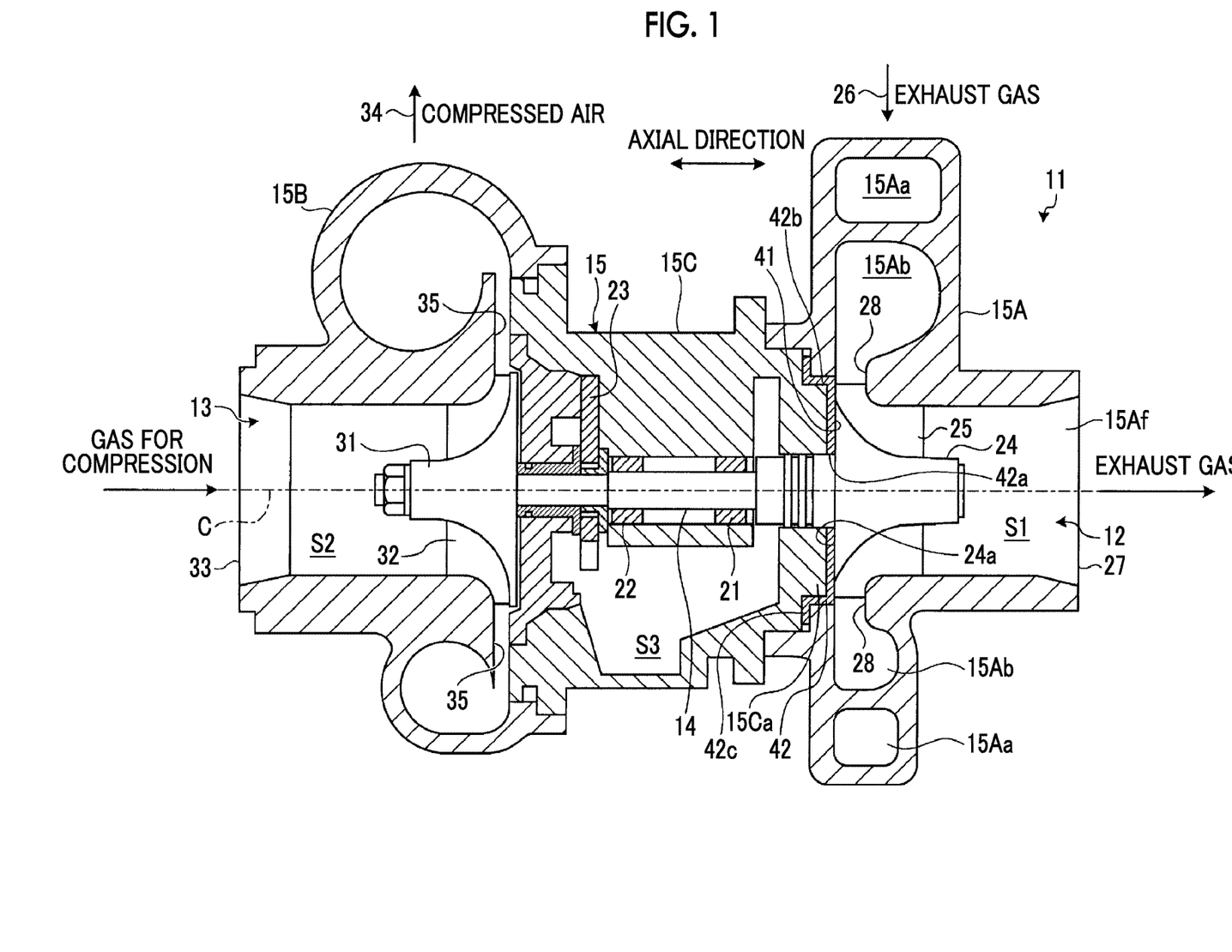
FIG. 1 is an overall configuration diagram of an exhaust gas turbocharger according to an embodiment of the present invention.
Figure 2:
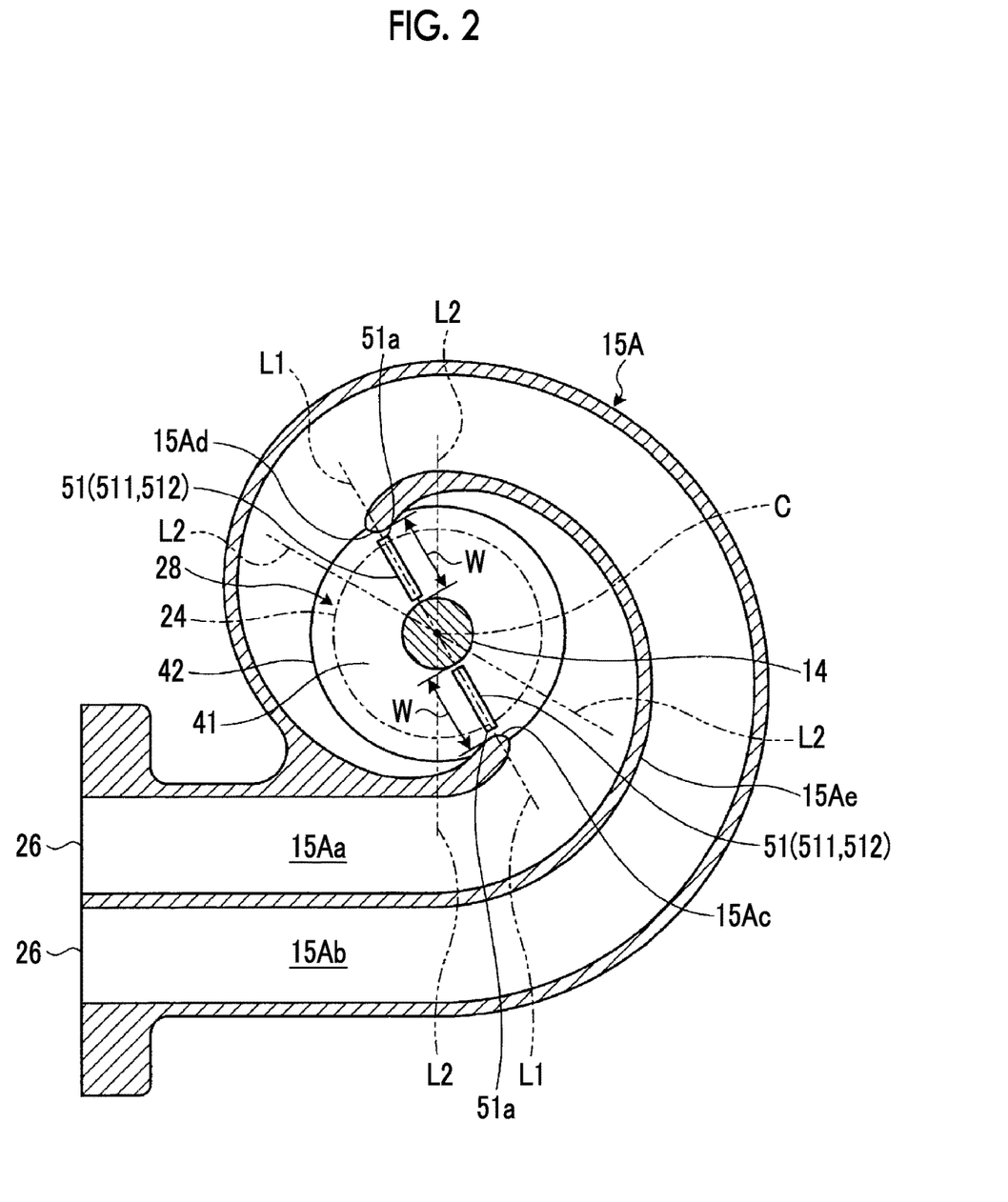
FIG. 2 is an axial sectional view of a turbine in the exhaust gas turbocharger according to the embodiment of the present invention.
Figure 3:
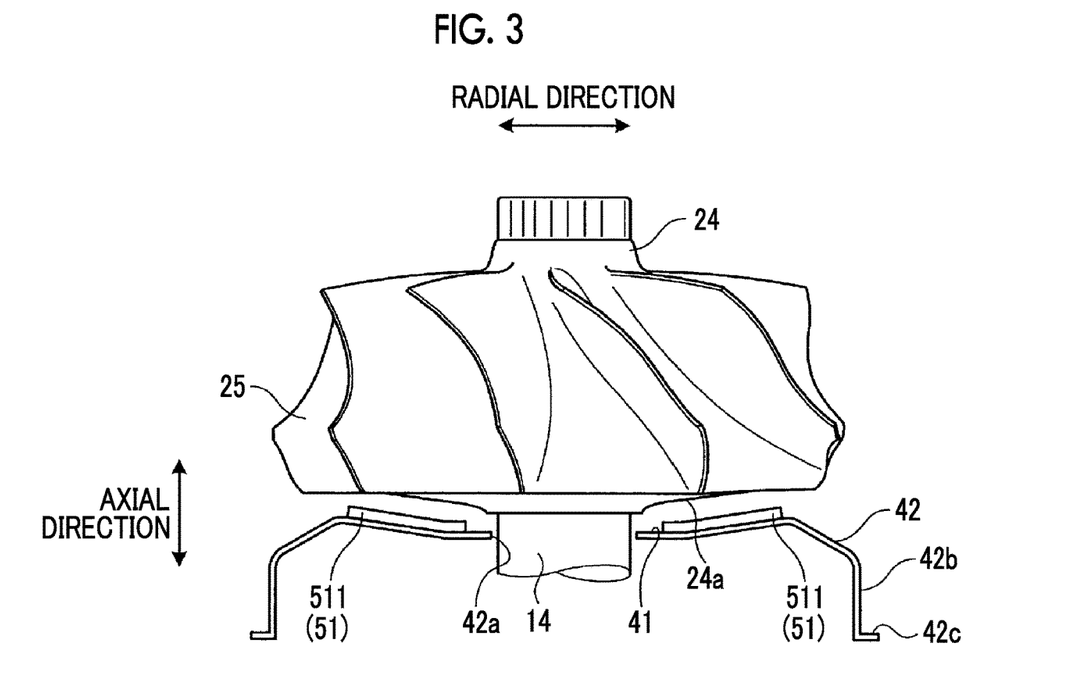
FIG. 3 is a radial sectional view of the turbine in the exhaust gas turbocharger according to the embodiment of the present invention.
Figure 4:
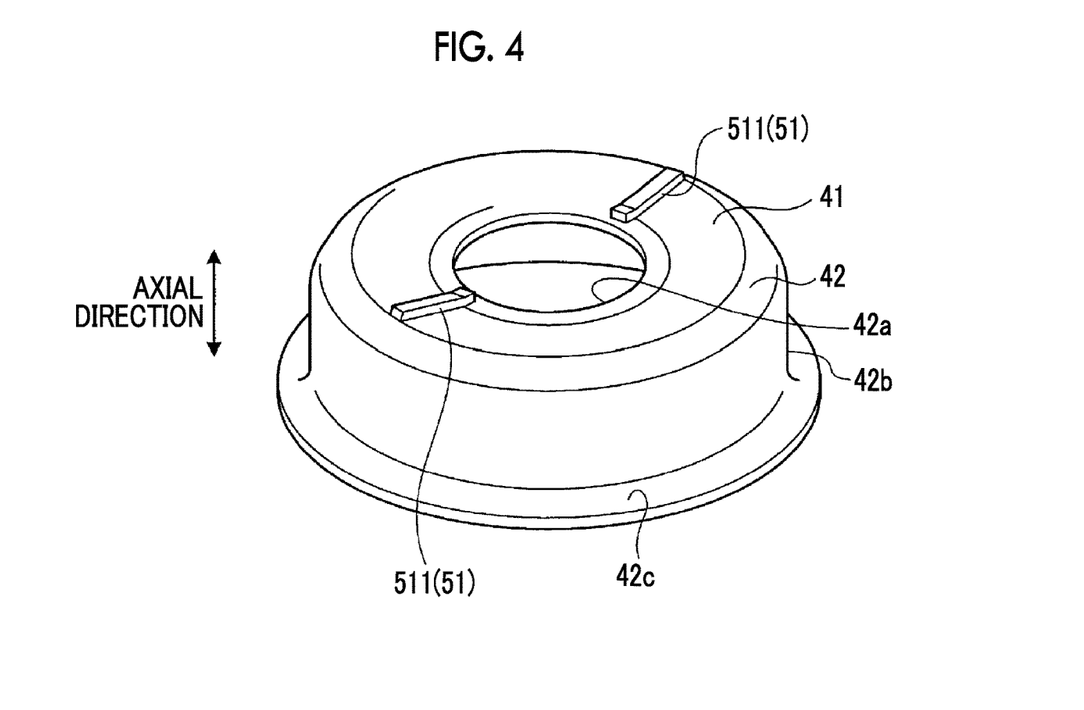
FIG. 4 is a partial perspective view of the turbine in the exhaust gas turbocharger according to the embodiment of the present invention.
Figure 5:
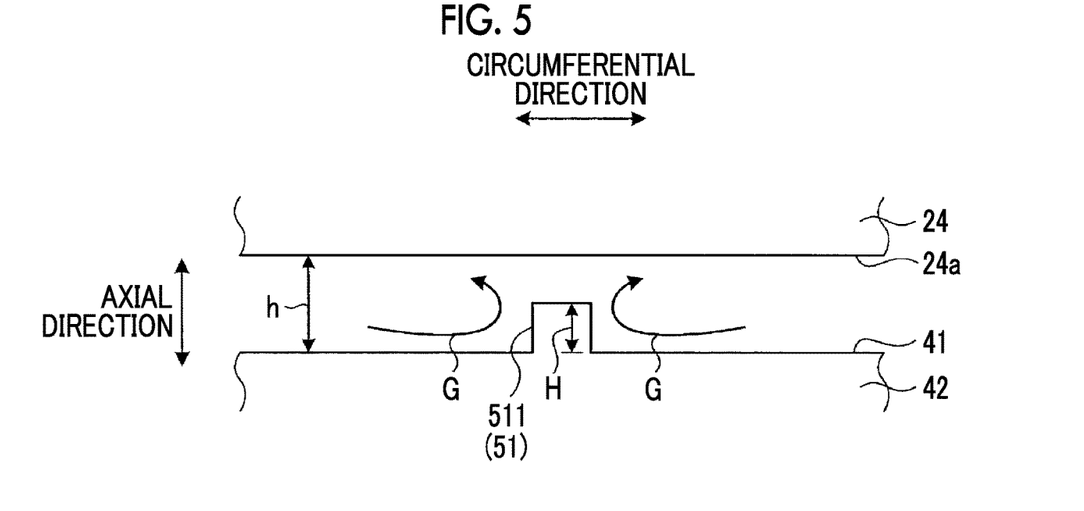
FIG. 5 is a schematic circumferential sectional view of the turbine in the exhaust gas turbocharger according to the embodiment of the present invention.

FIG. 1 is an overall configuration diagram of an exhaust gas turbocharger according to the present embodiment. FIG. 2 is an axial sectional view of a turbine in the exhaust gas turbocharger according to the present embodiment. FIG. 3 is a radial sectional view of the turbine in the exhaust gas turbocharger according to the present embodiment. FIG. 4 is a partial perspective view of the turbine in the exhaust gas turbocharger according to the present embodiment. FIG. 5 is a schematic circumferential sectional view of the turbine in the exhaust gas turbocharger according to the present embodiment.

An exhaust gas turbocharger 11 illustrated in FIG. 1 is configured to mainly include a turbine 12, a compressor (centrifugal compressor) 13, and a rotating shaft 14, all of which are accommodated inside a housing 15.

The housing 15 is formed to be internally hollow, and has a turbine housing 15A forming a first flow part S1 for accommodating configuration elements of the turbine 12, a compressor housing 15B forming a second flow part S2 for accommodating configuration elements of the compressor 13, and a bearing housing 15C forming a third flow part S3 for accommodating the rotating shaft 14. The third flow part S3 of the bearing housing 15C is located between the first flow part S1 of the turbine housing 15A and the second flow part S2 of the compressor housing 15B.

In the rotating shaft 14, an end portion on the turbine 12 side is rotatably supported by a journal bearing 21 serving as a turbine side bearing, and an end portion on the compressor 13 side is rotatably supported by a journal bearing 22 serving as a compressor side bearing. The rotating shaft 14 is restricted in moving in an axial direction in which the rotating shaft 14 extends by a thrust bearing 23. A center line C of the rotation of the rotating shaft 14 is indicated by a one-dot chain line in the drawing. In addition, in the rotating shaft 14, a turbine wheel 24 of the turbine 12 is fixed to one end portion in the axial direction. An outer peripheral portion of the turbine wheel 24 has a plurality of turbine blades (also referred to as rotor blades) 25 having an axial flow type and disposed at an interval in a circumferential direction (direction of the rotating shaft 14 turning around the center line C). The turbine wheel 24 is accommodated in the first flow part S1 of the turbine housing 15A in the housing 15. Furthermore, in the rotating shaft 14, an impeller 31 of the compressor 13 is fixed to the other end portion in the axial direction. In the impeller 31, a plurality of blades 32 are radially disposed at an interval in the circumferential direction around the center line C of the rotating shaft 14. The impeller 31 is accommodated in the second flow part S2 of the compressor housing 15B in the housing 15.

In addition, the turbine housing 15A has an exhaust gas intake port 26 for fetching exhaust gas into the turbine wheel 24, and an exhaust gas discharge port 27 for discharging the exhaust gas. Then, the turbine housing 15A has a turbine nozzle 28 disposed between the exhaust gas intake port 26 and the turbine wheel 24. An axial flow of the exhaust gas subjected to static pressure expansion by the turbine nozzle 28 is guided to the turbine blade 25 of the plurality of turbine wheels 24. In this manner, the turbine 12 can be rotationally driven.

The compressor housing 15B has an air intake port 33 for fetching gas for compression to the impeller 31, and a compressed air discharge port 34 for discharging compressed air. Then, the compressor housing 15B has a diffuser 35 disposed between the impeller 31 and the compressed air discharge port 34. The air compressed by the impeller 31 is discharged through the diffuser 35.

In the turbine housing 15A, as illustrated in FIGS. 1 and 2, a plurality of (two in the present embodiment) scroll passages 15Aa and 15Ab are disposed from the exhaust gas intake port 26 to the turbine nozzle 28. A plurality of the exhaust gas intake ports 26 are disposed so as to fetch the exhaust gas into the respective scroll passages 15Aa and 15Ab. Each of the scroll passages 15Aa and 15Ab is formed in a spiral shape outside the turbine wheel 24, and is divided into a plurality of pieces in the circumferential direction. According to the present embodiment, out of the two scroll passages 15Aa and 15Ab, one scroll passage 15Aa is disposed inward in the radial direction, and the other scroll passage 15Ab is disposed outward in the radial direction. In addition, the respective scroll passages 15Aa and 15Ab communicate with the turbine nozzle 28 (position of the turbine wheel 24), and the communicating end portions are formed as tongue sections 15Ac and 15Ad. The respective tongue sections 15Ac and 15Ad are disposed at axially symmetric positions based on the center line C of the rotating shaft 14. In FIGS. 1 and 2, the scroll passages 15Aa and 15Ab form two passages across one partition wall 15Ae, but may be respectively formed as independent pipelines. In addition, in the turbine housing 15A, as illustrated in FIG. 1, an exhaust gas discharge port 27 is formed in an end portion of a discharge passage 15Af disposed along the axial direction in which the rotating shaft 14 extends from the turbine nozzle 28. Then, in the turbine 12 having this configuration, the exhaust gas fetched from the respective exhaust gas intake ports 26 into the respective scroll passages 15Aa and 15Ab merges in the turbine nozzle 28 from the respective tongue sections 15Ac and 15Ad. The exhaust gas rotates the rotating shaft 14 via the turbine wheel 24. Thereafter, the exhaust gas is discharged from the exhaust gas discharge port 27 of the discharge passage 15Af.

According to the exhaust gas turbocharger 11 configured in this way, the turbine 12 is driven using the exhaust gas discharged from an engine (not illustrated), and the rotation of the turbine 12 is transmitted to the rotating shaft 14 so as to drive the compressor 13. The compressor 13 compresses the gas for combustion, and supplies the compressed gas to the engine. Specifically, the exhaust gas discharged from the engine passes through the respective scroll passages 15Aa and 15Ab from the respective exhaust gas intake ports 26, and is subjected to static pressure expansion by the turbine nozzle 28 so that the axial flow of the exhaust gas is guided to the plurality of turbine blades 25. In this manner, the turbine 12 is rotationally driven by the turbine wheel 24 to which the plurality of turbine blades 25 are fixed. Then, the exhaust gas driving the plurality of turbine blades 25 is discharged out of the exhaust gas discharge port 27. On the other hand, if the rotating shaft 14 is rotated by the turbine 12, the impeller 31 of the compressor 13 integrated with the rotating shaft 14 is rotated so as to suction the air from the air intake port 33. The suctioned air is pressurized by the impeller 31 so as to be the compressed air. The compressed air passes through the diffuser 35, and is supplied to the engine from the compressed air discharge port 34.

In the above-described exhaust gas turbocharger 11, the turbine 12 has a back surface 24a on an opposite side in the axial direction of the turbine blade 25 in the turbine wheel 24. The turbine 12 has a back facing surface 41 fixedly located facing the back surface 24a. According to the present embodiment, the back facing surface 41 is disposed in a plate section 42. The plate section 42 is also called a back plate or a packing, and is disposed on the back surface side of the turbine 12. For example, as illustrated in FIGS. 3 and 4, the plate section 42 is formed in a disk shape having a through-hole 42a through which the rotating shaft 14 penetrates. The plate section 42 is formed in a cup shape in which a wall portion 42b axially stands up on an outer periphery of the plate section 42. The plate section 42 is located so as to cover a boss portion 15Ca through which the rotating shaft 14 penetrates by projecting from the bearing housing 15C to the turbine housing 15A side. A flange portion 42c in an end of the wall portion 42b is interposed between the bearing housing 15C and the turbine housing 15A. In this manner, the plate section 42 is fixedly located in the housing 15.

Then, in the exhaust gas turbocharger 11 according to the present embodiment, in the turbine 12, a thread 51 is formed on the back facing surface 41 facing the back surface 24a of the turbine wheel 24. As a form of the thread 51, as illustrated in FIGS. 3 to 5, the thread 51 is formed as a convex object 511 projecting from the back facing surface 41 toward the back surface 24a of the turbine wheel 24. As illustrated in FIG. 2, the thread 51 is disposed while extending toward the rotating shaft 14 side from a starting point 51a located in the vicinity of the tongue sections 15Ac and 15Ad. Here, as illustrated in FIG. 2, the vicinity of the respective tongue sections 15Ac and 15Ad falls within a range formed by respective straight lines L2 at ±30 degrees based on the center of the rotating shaft 14 with respect to a straight line L1 connecting the respective tongue sections 15Ac and 15Ad and the center (center line C) of the rotating shaft 14 to each other. Therefore, in the thread 51, the starting point 51a is located within the range formed by the respective straight lines L2. The thread 51 is disposed at a position which does not come into contact with the rotating shaft 14, and does not inhibit the rotation of the rotating shaft 14.

Incidentally, in the turbine 12 having the respective scroll passages 15Aa and 15Ab divided into the plurality of pieces in the circumferential direction, for example, in a case where the pressure of the exhaust gas fetched into one scroll passages 15Aa is lower than the pressure of the exhaust gas fetched into the other scroll passage 15Ab (including a case where the exhaust gas is fetched only into the other scroll passage 15Ab) by using the configuration divided into two, the exhaust gas flowing into the other scroll passage 15Ab having the higher pressure does not pass through the turbine blade 25 side of the turbine wheel 24, thereby causing a possibility that the exhaust gas may leak out to the one scroll passage 15Aa side through the back surface 24a side. The exhaust gas flowing after leaking out through the back surface 24a side does not affect the operation of the turbine wheel 24 which rotates the rotating shaft 14. Therefore, a throughput of the turbine wheel 24 decreases, thereby resulting in decreasing turbine efficiency.

In this regard, according to of the exhaust gas turbocharger 11 of the present embodiment, the convex object 511 serving as the thread 51 is formed on the back facing surface 41 which faces the back surface 24a of the turbine wheel 24. Therefore, as illustrated in FIG. 5, exhaust gas G which tries to pass through the back surface 24a side of the turbine wheel 24 is blocked by the convex object 511. In this way, the passage of the fluid is suppressed between the back surface 24a of the turbine wheel 24 and the back facing surface 41. In this manner, a large amount of the exhaust gas passes through the turbine blade 25 side of the turbine wheel 24. Therefore, the decrease in the throughput of the turbine wheel 24 can be suppressed so as to prevent the decreasing turbine efficiency.

In order to obtain the above-described advantageous effect, as illustrated in FIG. 2, it is preferable that the convex object 511 serving as the thread 51 is present at least within a range of 0.6 W or shorter from the respective tongue sections 15Ac and 15Ad with respect to a shortest distance W between the respective tongue sections 15Ac and 15Ad and the rotating shaft 14.

In addition, the convex object 511 serving as the thread 51 is disposed at a position which does not come into contact with the turbine wheel 24, and does not inhibit the rotation of the turbine wheel 24. Specifically, as illustrated in FIG. 5, in order to suppress the passage of the fluid between the back surface 24a of the turbine wheel 24 and the back facing surface 41, it is preferable that a projection height H from the back facing surface 41 of the convex object 511 falls within a range of 0.2 h to 0.8 h with respect to an axial distance h between the back surface 24a of the turbine wheel 24 and the back facing surface 41.

In this way, according to the exhaust gas turbocharger 11 of the present embodiment, the back facing surface 41 fixedly located facing the back surface 24a of the turbine wheel 24 includes the convex object 511 serving as the thread 51 extending toward the rotating shaft 14 side from the starting point 51a in the vicinity of the respective tongue sections 15Ac and 15Ad so as to suppress the passage of the fluid between the back surface 24a and the back facing surface 41. In this manner, the leakage flow to the scroll passage 15Aa (15Ab) on the low pressure side can be suppressed using the configuration in which the scroll passages 15Aa and 15Ab are divided into the plurality of pieces in the circumferential direction. As a result, a large amount of the exhaust gas can pass through the turbine blade 25 side of the turbine wheel 24. Therefore, the decrease in the throughput of the turbine wheel 24 can be suppressed so as to prevent the decreasing turbine efficiency.

In addition, according to the exhaust gas turbocharger 11 of the present embodiment, in the convex object 511 serving as the thread 51, the starting point 51a is located within a range of ±30 degrees based on the center of the rotating shaft 14 with respect to the straight line L1 connecting the tongue sections 15Ac and 15Ad and the center of the rotating shaft 14 to each other. In this manner, it is possible to suppress the leakage flow in the vicinity of the tongue sections 15Ac and 15Ad where a pressure difference is likely to be generated. Therefore, an advantageous effect of preventing the decreasing turbine efficiency can be significantly obtained.

In addition, according to the exhaust gas turbocharger 11 of the present embodiment, the thread 51 includes the convex object 511 projecting from the back facing surface 41 toward the back surface 24a of the turbine wheel 24. In this manner, the exhaust gas G trying to pass through the back surface 24a side of the turbine wheel 24 is blocked by the thread 51. Accordingly, the decreasing turbine efficiency can be prevented by suppressing the passage of the fluid between the back surface 24a of the turbine wheel 24 and the back facing surface 41.

In addition, according to the exhaust gas turbocharger 11 of the present embodiment, the back facing surface 41 may be formed in the plate section 42 located on the back surface 24a side of the turbine wheel 24. The thread 51 may include the convex object 511 projecting from the back facing surface 41 toward the back surface 24a of the turbine wheel 24, and may be attached separately from the plate section 42.

Specifically, the convex object 511 serving as the thread 51 is attached separately from the plate section 42 by means of overlay welding. According to this configuration, after the plate section 42 is formed, the projection height H of the convex object 511 can be set in accordance with the axial distance h between the back surface 24a of the turbine wheel 24 and the back facing surface 41. It is possible to set the projection height H of the convex object 511 suitable for an assembly error of the axial distance h between the back surface 24a of the turbine wheel 24 and the back facing surface 41.

In addition, according to the exhaust gas turbocharger 11 of the present embodiment, the back facing surface 41 may be formed in the plate section 42 located on the back surface 24a side of the turbine wheel 24, and the convex object 511 serving as the thread 51 may be integrally formed with the plate section 42.

Specifically, the convex object 511 serving as the thread 51 is formed by folding sheet metal in the plate section 42 formed of the sheet metal, or is formed together with the plate section 42 formed by means of casting (precision casting).

Figure 6:
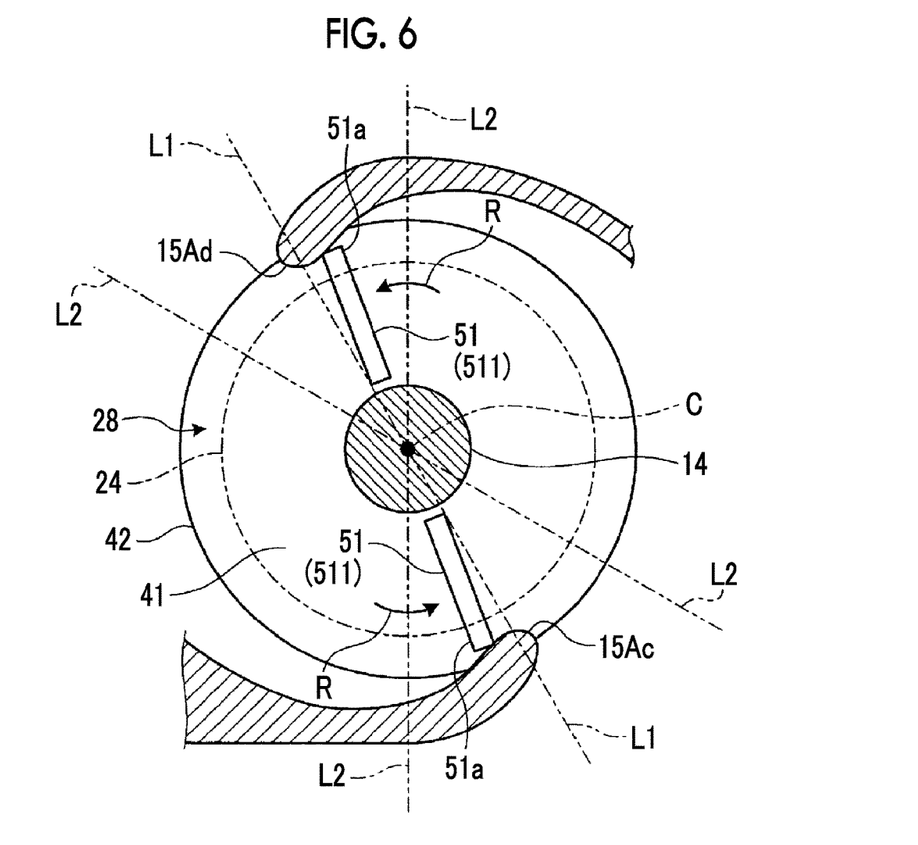
FIG. 6 is an axial sectional view of another example of the turbine in the exhaust gas turbocharger according to the embodiment of the present invention.
Figure 7:
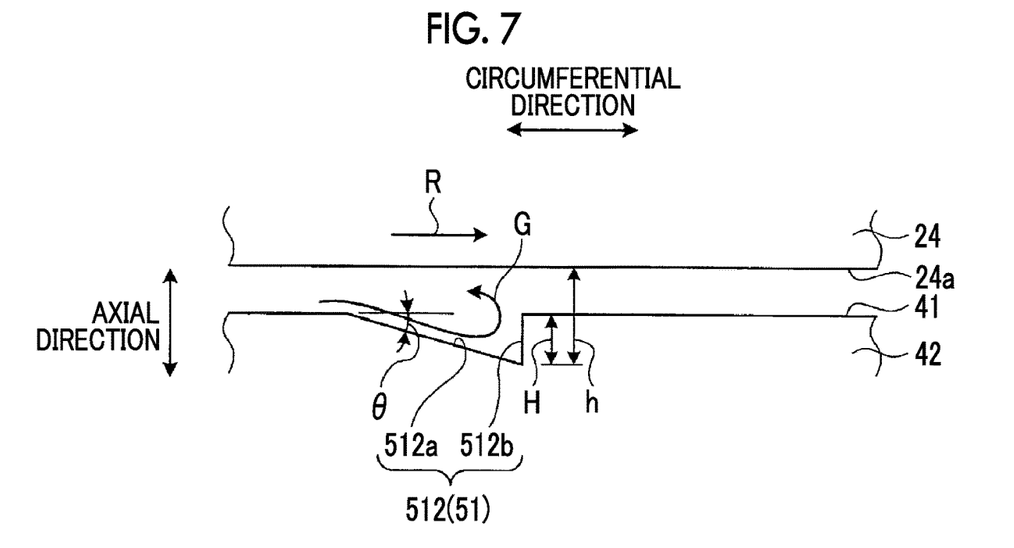
FIG. 7 is a schematic radial position sectional view of another example of the turbine in the exhaust gas turbocharger according to the embodiment of the present invention.
Figure 8:
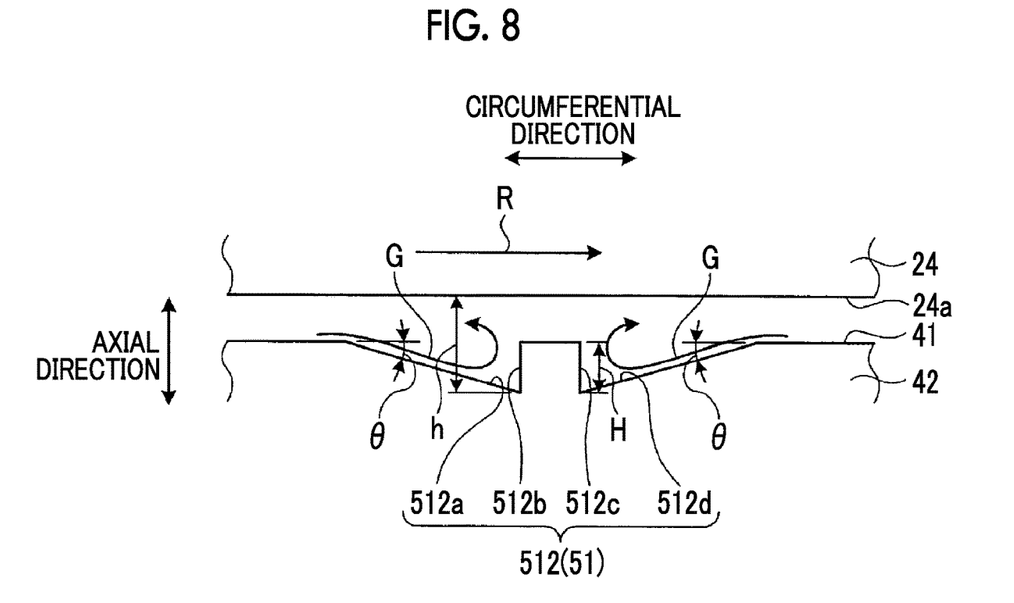
FIG. 8 is a schematic radial position sectional view of another example of the turbine in the exhaust gas turbocharger according to the embodiment of the present invention.
Figure 9:
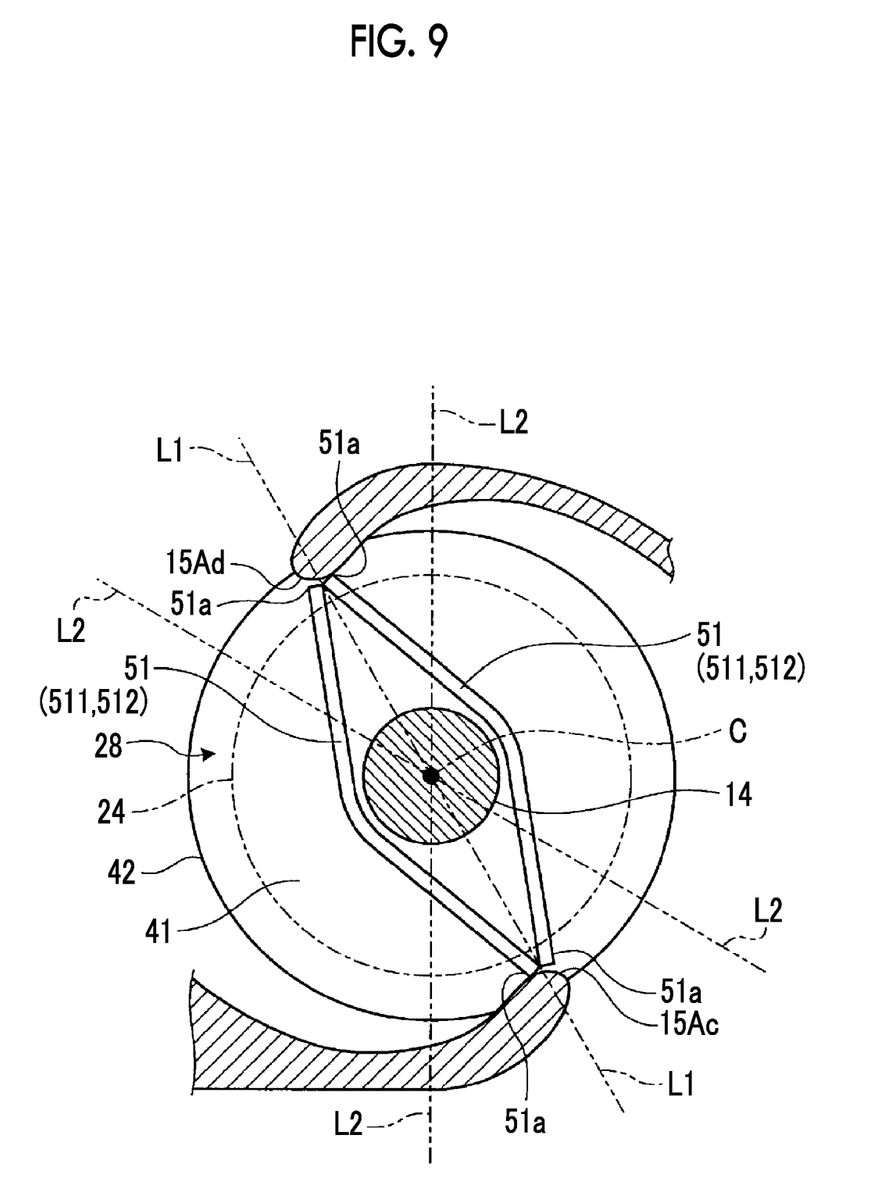
FIG. 9 is an axial sectional view of another example of the turbine in the exhaust gas turbocharger according to the embodiment of the present invention.

FIG. 6 is an axial sectional view of another example of the turbine in the exhaust gas turbocharger according to the present embodiment. FIG. 7 is a schematic radial position sectional view of another example of the turbine in the exhaust gas turbocharger according to the present embodiment. FIG. 8 is a schematic radial position sectional view of another example of the turbine in the exhaust gas turbocharger according to the present embodiment. FIG. 9 is an axial sectional view of another example of the turbine in the exhaust gas turbocharger according to the present embodiment.

As another example of the exhaust gas turbocharger 11 of the present embodiment, as illustrated in FIG. 6, the back facing surface 41 may be formed in the plate section 42 located on the back surface 24a side of the turbine wheel 24. The thread 51 may include the convex object 511 projecting from the back facing surface 41 toward the back surface 24a of the turbine wheel 24. In the convex object 511, the starting point 51a may be locked to the upstream side in the rotating direction (direction of an arrow R in FIG. 6) of the turbine wheel 24 in the tongue sections 15Ac and 15Ad.

As described above, the respective scroll passages 15Aa and 15Ab are formed in a spiral shape outside the turbine wheel 24, and end portions thereof are formed as the tongue sections 15Ac and 15Ad. Therefore, the respective tongue sections 15Ac and 15Ad are formed in an arc shape as illustrated in FIG. 6. With respect to such arc-shaped tongue sections 15Ac and 15Ad, the convex object 511 is formed so that the starting point 51a comes into contact with the upstream side in the rotating direction of the turbine wheel 24 in the tongue sections 15Ac and 15Ad and is locked to the tongue sections 15Ac and 15Ad.

According to this configuration, the exhaust gas flows along the rotating direction of the turbine wheel 24, and the convex object 511 is locked to the tongue sections 15Ac and 15Ad against the flow of the exhaust gas. Therefore, even if the plate section 42 is not fixed to the housing 15, the rotational movement of the convex object 511 can be prevented. Moreover, if the convex object 511 is locked to the tongue sections 15Ac and 15Ad at the time of assembly, the convex object 511 can be positioned, and the assembly workability can be improved.

As another example of the exhaust gas turbocharger 11 of the present embodiment, in the turbine 12, as illustrated in FIG. 7, the back facing surface 41 facing the back surface 24a of the turbine wheel 24 has the thread 51. As a form of the thread 51, the thread 51 is formed as a concave object 512 recessed opposing the back surface 24a of the turbine wheel 24 from the back facing surface 41. The concave object 512 has an inclined bottom surface 512a and a bottom of the inclined bottom surface 512a recessed while being inclined from the upstream side to the downstream side in the rotating direction (direction of the arrow R in FIG. 7) of the turbine wheel 24. The concave object 512 has a standing wall surface 512b standing up from the bottom of the inclined bottom surface 512a toward the back surface 24a of the turbine wheel 24. As illustrated in FIG. 2, the thread 51 is disposed so as to extend toward the rotating shaft 14 side from the starting point 51a located in the vicinity of the respective tongue sections 15Ac and 15Ad. Here, as illustrated in FIG. 2, the vicinity of the respective tongue sections 15Ac and 15Ad falls within a range formed by respective straight lines L2 at ±30 degrees based on the center of the rotating shaft 14 with respect to the straight line L1 connecting the respective tongue sections 15Ac and 15Ad and the center (center line C) of the rotating shaft 14 to each other. Therefore, in the thread 51, the starting point 51a is located within the range formed by the respective straight lines L2.

According to the exhaust gas turbocharger 11, the concave object 512 serving as the thread 51 is formed on the back facing surface 41 which faces the back surface 24a of the turbine wheel 24. Therefore, as illustrated in FIG. 7, while the exhaust gas G trying to pass through the back surface 24a side along a rotating direction R of the turbine wheel 24 is guided by the inclined bottom surface 512a, the exhaust gas G is caused to collide with the standing wall surface 512b. In this manner, the exhaust gas G is blocked. In this way, a large amount of the exhaust gas passes through the turbine blade 25 side of the turbine wheel 24 by suppressing the passage of the fluid between the back surface 24a of the turbine wheel 24 and the back facing surface 41. Therefore, the decrease in the throughput of the turbine wheel 24 can be suppressed so as to prevent the decreasing turbine efficiency.

In the concave object 512 serving as the thread 51, if an angle θ recessed to the back facing surface 41 is smaller, the exhaust gas G can be prevented from being separated from the inclined bottom surface 512a, and the exhaust gas G can be guided to the standing wall surface 512b along the inclined bottom surface 512a. It is preferable that the angle θ is 15 degrees or smaller. As a result, the exhaust gas G is caused to reliably collide with the standing wall surface 512b, and can be blocked. In this manner, the larger amount of the exhaust gas can pass through the turbine blade 25 side of the turbine wheel 24. Therefore, the decrease in the throughput of the turbine wheel 24 can be suppressed so as to significantly obtain an advantageous effect of preventing the decreasing turbine efficiency.

In order to obtain the above-described advantageous effect, as illustrated in FIG. 2, it is preferable that the concave object 512 serving as the thread 51 is present at least within a range of 0.6 W or shorter from the respective tongue sections 15Ac and 15Ad with respect to the shortest distance W between the respective tongue sections 15Ac and 15Ad and the rotating shaft 14.

In addition, as illustrated in FIG. 7, in order to suppress the passage of the fluid between the back surface 24a of the turbine wheel 24 and the back facing surface 41 in the convex object 511 serving as the thread 51, it is preferable that the height H of the standing wall surface 512b standing up from the bottom of the inclined bottom surface 512a falls within a range of 0.2 h to 0.8 h with respect to the axial distance h between the back surface 24a of the turbine wheel 24 and the bottom of the inclined bottom surface 512a.

In this way, according to the exhaust gas turbocharger 11 of the present embodiment, the back facing surface 41 fixedly located facing the back surface 24a of the turbine wheel 24 includes the concave object 512 serving as the thread 51 extending toward the rotating shaft 14 side from the starting point 51a in the vicinity of the respective tongue sections 15Ac and 15Ad so as to suppress the passage of the fluid between the back surface 24a and the back facing surface 41. In this manner, the leakage flow to the scroll passage 15Aa (15Ab) on the low pressure side can be suppressed using the configuration in which the scroll passages 15Aa and 15Ab are divided into the plurality of pieces in the circumferential direction. As a result, a large amount of the exhaust gas can pass through the turbine blade 25 side of the turbine wheel 24. Therefore, the decrease in the throughput of the turbine wheel 24 can be suppressed so as to prevent the decreasing turbine efficiency.

In addition, according to the exhaust gas turbocharger 11 of the present embodiment, the thread 51 includes the concave object 512 recessed opposing the back surface 24a of the turbine wheel 24 from the back facing surface 41. Accordingly, if a distance between the back surface 24a of the turbine wheel 24 and the back facing surface 41 is narrow and a projection such as the convex object 511 is disposed, even in a case where the convex object 511 comes into contact with the back surface 24a of the turbine wheel 24, the thread 51 can be installed.

In addition, according to the exhaust gas turbocharger 11 of the present embodiment, in the concave object 512 serving as the thread 51, the starting point 51a is located within the range of ±30 degrees based on the center of the rotating shaft 14 with respect to the straight line L1 connecting the tongue sections 15Ac and 15Ad and the center of the rotating shaft 14 to each other. In this manner, the leakage flow can be suppressed in the vicinity of the tongue sections 15Ac and 15Ad where the leakage is likely to occur due to the speed increased by the turbine wheel in addition to the pressure difference adding the rotational speed by the turbine wheel in addition to the pressure difference. Therefore, an advantageous effect of preventing the decreasing turbine efficiency can be significantly obtained.

In addition, according to the exhaust gas turbocharger 11 of the present embodiment, it is preferable that the back facing surface 41 is formed in the plate section 42 located on the back surface 24a side of the turbine wheel 24, and the concave object 512 serving as the thread 51 is formed integrally with the plate section 42.

Specifically, the concave object 512 serving as the thread 51 is formed by folding sheet metal in the plate section 42 formed of the sheet metal, or is formed together with the plate section 42 formed by means of casting (precision casting). According to this configuration, the concave object 512 serving as the thread 51 can be formed together in a manufacturing process of the plate section 42, and the manufacturing process can be shortened compared to a case where both of these are separately formed.

Furthermore, as another example of the exhaust gas turbocharger 11 according to the present embodiment, as illustrated in FIG. 8, a configuration may be adopted as follows. The concave object 512 serving as the thread 51 has a first inclined bottom surface 512a recessed while being inclined from the upstream side to the downstream side in the rotating direction (direction of the arrow R in FIG. 8) of the turbine wheel 24. The concave object 512 has a first standing wall surface 512b standing up toward the back surface 24a of the turbine wheel 24 from the bottom of the first inclined bottom surface 512a. The concave object 512 further has a second standing wall surface 512c opposing the first standing wall surface 512b on the downstream side. The concave object 512 has a second inclined bottom surface 512d rising up while being inclined from the second standing wall surface 512c toward the back surface 24a of the turbine wheel 24.

According to the exhaust gas turbocharger 11, the concave object 512 serving as the thread 51 is formed on the back facing surface 41 which faces the back surface 24a of the turbine wheel 24. Therefore, as illustrated in FIG. 8, while the exhaust gas G trying to pass through the back surface 24a side along the rotating direction R of the turbine wheel 24 is guided by the first inclined bottom surface 512a, the exhaust gas G is caused to collide with the first standing wall surface 512b. In this manner, the exhaust gas G is blocked.

Moreover, according to the exhaust gas turbocharger 11, while the exhaust gas G trying to pass through the back surface 24a side along a direction opposite to the rotating direction R of the turbine wheel 24 is guided by the second inclined bottom surface 512d, the exhaust gas G is caused to collide with the second standing wall surface 512c. In this manner, the exhaust gas G is blocked. In this way, a large amount of the exhaust gas passes through the turbine blade 25 side of the turbine wheel 24 by suppressing the passage of the fluid between the back surface 24a of the turbine wheel 24 and the back facing surface 41. Therefore, the decrease in the throughput of the turbine wheel 24 can be suppressed so as to prevent the decreasing turbine efficiency.

Furthermore, as another example of the exhaust gas turbocharger 11 according to the present embodiment, as illustrated in FIG. 9, the convex object 511 or the concave object 512 serving as the thread 51 may be continuously formed from one tongue section 15Ac to the other tongue section 15Ad along a side portion of the rotating shaft 14.

According to the exhaust gas turbocharger 11, the convex object 511 or the concave object 512 serving as the thread 51 is continuously formed from one tongue section 15Ac to the other tongue section 15Ad. Accordingly, the passage of the fluid is reliably suppressed between the back surface 24a of the turbine wheel 24 and the back facing surface 41. In this manner, the larger amount of the exhaust gas can pass through the turbine blade 25 side of the turbine wheel 24. Therefore, the decrease in the throughput of the turbine wheel 24 can be suppressed so as to significantly obtain an advantageous effect of preventing the decreasing turbine efficiency.

In addition, as another example of the exhaust gas turbocharger 11 according to the present embodiment, as illustrated in FIG. 9, the convex objects 511 or the concave objects 512 serving as the threads 51 may be continuously formed from one tongue section 15Ac to the other tongue section 15Ad along a side portion of the rotating shaft 14, and may be respectively located in both side portions of the rotating shaft 14 serving as a boundary.

According to the exhaust gas turbocharger 11, the convex objects 511 or the concave objects 512 serving as the threads 51 are continuously formed from one tongue section 15Ac to the other tongue section 15Ad, and are respectively located in both side portions of the rotating shaft 14 serving as the boundary. Accordingly, the passage of the fluid is more reliably suppressed between the back surface 24a of the turbine wheel 24 and the back facing surface 41. In this manner, the larger amount of the exhaust gas can pass through the turbine blade 25 side of the turbine wheel 24. Therefore, the decrease in the throughput of the turbine wheel 24 can be suppressed so as to significantly obtain an advantageous effect of preventing the decreasing turbine efficiency.

REFERENCE SIGNS LIST

11: exhaust gas turbocharger
12: turbine
14: rotating shaft
15: housing
15A: turbine housing
15Aa, 15Ab: scroll passage
15Ac, 15Ad: tongue section
24: turbine wheel
24a: back surface
25: turbine blade
41: back facing surface
42: plate section
51: thread
51a: starting point
511: convex object
512: concave object
512a: inclined bottom surface
512a: first inclined bottom surface
512b: standing wall surface
512b: first standing wall surface
512c: second standing wall surface
512d: second inclined bottom surface

The invention claimed is:

1. An exhaust gas turbocharger comprising:
a turbine wheel attached to a rotating shaft and having a plurality of turbine blades in a circumferential direction;
respective scroll passages formed in a spiral shape outside the turbine wheel, divided into a plurality of pieces in the circumferential direction, and communicating with each other at a position of the turbine wheel located between mutual tongue sections; and
a thread disposed on a back facing surface located to face a back surface axially opposite to a turbine blade side of the turbine wheel, the back facing surface including a flat portion extending from an outer periphery of the turbine wheel to an inner periphery of the turbine wheel, and the thread extending toward a rotating shaft side from a starting point in a vicinity of the respective tongue sections so as to suppress a passage of a fluid between the back surface and the back facing surface.

2. The exhaust gas turbocharger according to claim 1, wherein the starting point of the thread is located within a range of ±30 degrees based on a center of the rotating shaft from a straight line connecting the tongue section and the center of the rotating shaft.

3. The exhaust gas turbocharger according to claim 2, wherein the thread is continuously formed from one of the tongue sections to the other one of the tongue sections along a side portion of the rotating shaft.

4. The exhaust gas turbocharger according to claim 2, wherein the thread is continuously formed from one of the tongue sections to the other one of the tongue sections along a side portion of the rotating shaft, and are respectively located in both side portions of the rotating shaft serving as a boundary.

5. The exhaust gas turbocharger according to claim 2, wherein the back facing surface is formed in a plate section to be located on a back surface side of the turbine wheel, and
wherein the thread is formed integrally with the plate section.

6. The exhaust gas turbocharger according to claim 2, wherein the thread includes a convex object projecting from the back facing surface toward the back surface of the turbine wheel.

7. The exhaust gas turbocharger according to claim 2, wherein the back facing surface is formed in a plate section to be located on a back surface side of the turbine wheel, and
wherein the thread includes a convex object projecting from the back facing surface toward the back surface of the turbine wheel, and is attached separately from the plate section.

8. The exhaust gas turbocharger according to claim 1, wherein the thread is continuously formed from one of the tongue sections to the other one of the tongue sections along a side portion of the rotating shaft.

9. The exhaust gas turbocharger according to claim 8,
wherein the back facing surface is formed in a plate section to be located on a back surface side of the turbine wheel, and
wherein the thread is formed integrally with the plate section.

10. The exhaust gas turbocharger according to claim 8,
wherein the thread includes a convex object projecting from the back facing surface toward the back surface of the turbine wheel.

11. The exhaust gas turbocharger according to claim 1,
wherein the thread is continuously formed from one of the tongue sections to the other one of the tongue sections along a side portion of the rotating shaft, and are respectively located in both side portions of the rotating shaft serving as a boundary.

12. The exhaust gas turbocharger according to claim 11,
wherein the back facing surface is formed in a plate section to be located on a back surface side of the turbine wheel, and
wherein the thread is formed integrally with the plate section.

13. The exhaust gas turbocharger according to claim 11,
wherein the thread includes a convex object projecting from the back facing surface toward the back surface of the turbine wheel.

14. The exhaust gas turbocharger according to claim 1,
wherein the back facing surface is formed in a plate section to be located on a back surface side of the turbine wheel, and
wherein the thread is formed integrally with the plate section.

15. The exhaust gas turbocharger according to claim 14,
wherein the thread includes a convex object projecting from the back facing surface toward the back surface of the turbine wheel.

16. The exhaust gas turbocharger according to claim 1,
wherein the thread includes a convex object projecting from the back facing surface toward the back surface of the turbine wheel.

17. The exhaust gas turbocharger according to claim 16,
wherein the back facing surface is formed in a plate section to be located on a back surface side of the turbine wheel, and
wherein the convex object is disposed in the plate section so that the starting point is locked to an upstream side in the tongue section in a rotating direction of the turbine wheel.

18. The exhaust gas turbocharger according to claim 1,
wherein the back facing surface is formed in a plate section to be located on a back surface side of the turbine wheel, and
wherein the thread includes a convex object projecting from the back facing surface toward the back surface of the turbine wheel, and is attached separately from the plate section.

19. The exhaust gas turbocharger according to claim 1,
wherein the thread includes a concave object recessed opposing the back surface of the turbine wheel from the back facing surface, and
wherein the concave object has an inclined bottom surface recessed while being inclined from an upstream side to a downstream side in a rotating direction of the turbine wheel, and has a standing wall surface standing up from the inclined bottom surface toward the back surface of the turbine wheel.

20. The exhaust gas turbocharger according to claim 1,
wherein the thread includes a concave object recessed opposing the back surface of the turbine wheel from the back facing surface,
wherein the concave object has a first inclined bottom surface recessed while being inclined from an upstream side to a downstream side in a rotating direction of the turbine wheel, has a first standing wall surface standing up from the first inclined bottom surface toward the back surface of the turbine wheel, further has a second standing wall surface opposing the first standing wall surface on the downstream side, and has a second inclined bottom surface rising up while being inclined from the second standing wall surface toward the back surface of the turbine wheel.

\* \* \* \* \*